(12) United States Patent
Thiel et al.

(10) Patent No.: US 11,236,881 B2
(45) Date of Patent: Feb. 1, 2022

(54) HEADLIGHT FOR A VEHICLE

(71) Applicant: VOLKSWAGEN AKTIENGESELLSCHAFT, Wolfsburg (DE)

(72) Inventors: Alexander Thiel, Braunschweig (DE); Ines Opaska, Schoeningen (DE); Christoph Loose, Braunschweig (DE); Mathias Thamm, Oebisfelde (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 39 days.

(21) Appl. No.: 16/639,830

(22) PCT Filed: Jun. 20, 2018

(86) PCT No.: PCT/EP2018/066488
§ 371 (c)(1),
(2) Date: Feb. 18, 2020

(87) PCT Pub. No.: WO2019/034306
PCT Pub. Date: Feb. 21, 2019

(65) Prior Publication Data
US 2020/0263849 A1 Aug. 20, 2020

(30) Foreign Application Priority Data
Aug. 17, 2017 (DE) .......................... 102017214346.0

(51) Int. Cl.
*F21S 41/657* (2018.01)
*F21S 41/63* (2018.01)
*F21S 41/663* (2018.01)
*F21S 41/153* (2018.01)
*B60Q 1/068* (2006.01)
*B60Q 1/076* (2006.01)
(Continued)

(52) U.S. Cl.
CPC ............ *F21S 41/657* (2018.01); *B60Q 1/068* (2013.01); *B60Q 1/076* (2013.01); *F21S 41/153* (2018.01); *F21S 41/635* (2018.01); *F21S 41/663* (2018.01); *F21S 45/47* (2018.01); *F21W 2102/13* (2018.01); *F21W 2102/19* (2018.01); *F21Y 2115/10* (2016.08)

(58) Field of Classification Search
None
See application file for complete search history.

(56) References Cited

U.S. PATENT DOCUMENTS 6,773,152 B2   8/2004 Ruckwied
8,523,415 B2 * 9/2013 Kiel .................. F21S 43/30
                                                        362/519
(Continued)

FOREIGN PATENT DOCUMENTS

CN       104373895 A    2/2015
DE    602004000596 T2   6/2007
(Continued)

*Primary Examiner* — Amy Cohen Johnson
*Assistant Examiner* — Srinivas Sathiraju
(74) *Attorney, Agent, or Firm* — Laurence A. Greenberg; Werner H. Stemer; Ralph E. Locher

(57) ABSTRACT

A headlight (10) and a lighting system (54) with the headlight (10) and a control unit. A motor vehicle (52) has the headlight (10), which combines a full beam matrix (20) and a dipped light in a common pivotable lighting module (18).

10 Claims, 3 Drawing Sheets

(51) Int. Cl.
*F21Y 115/10* (2016.01)
*F21W 102/13* (2018.01)
*F21W 102/19* (2018.01)
*F21S 45/47* (2018.01)

(56) References Cited

U.S. PATENT DOCUMENTS

| | | | |
|---|---|---|---|
| 8,801,242 B2 | 8/2014 | Hamm et al. | |
| 9,157,605 B2* | 10/2015 | Rodriguez | F21V 9/08 |
| 9,187,027 B2* | 11/2015 | Yamasaki | F21S 41/162 |
| 9,416,927 B2* | 8/2016 | Rodriguez | C09K 11/7774 |
| 9,494,288 B2* | 11/2016 | Kobayashi | B60Q 1/1423 |
| 9,576,377 B1* | 2/2017 | Yett | G09F 13/32 |
| 9,989,629 B1* | 6/2018 | LaChapelle | G01S 7/4816 |
| 10,139,073 B2* | 11/2018 | Wentz, Jr. | B60Q 1/2611 |
| 10,180,223 B2* | 1/2019 | Grammer | F21S 41/39 |
| 10,338,220 B1* | 7/2019 | Raring | G01S 7/487 |
| 10,416,548 B1* | 9/2019 | Yett | G03B 21/562 |
| 10,578,720 B2* | 3/2020 | Hughes | G02B 26/0816 |
| 2011/0103085 A1* | 5/2011 | Kiel | F21S 43/26 |
| | | | 362/519 |
| 2013/0286633 A1* | 10/2013 | Rodriguez | C09K 11/883 |
| | | | 362/84 |
| 2014/0175978 A1* | 6/2014 | Kobayashi | F21S 41/18 |
| | | | 315/82 |
| 2015/0035440 A1* | 2/2015 | Spero | F21S 41/153 |
| | | | 315/153 |
| 2015/0217679 A1* | 8/2015 | Paine | F21V 15/013 |
| | | | 362/517 |
| 2015/0321598 A1* | 11/2015 | Kanayama | F21S 41/285 |
| | | | 362/487 |
| 2016/0010813 A1* | 1/2016 | Rodriguez | F21V 9/38 |
| | | | 362/84 |
| 2016/0281951 A1* | 9/2016 | Nakazato | F21S 41/336 |
| 2017/0129394 A1* | 5/2017 | Salter | F21S 41/43 |
| 2018/0038570 A1* | 2/2018 | Kanayama | B60Q 1/04 |
| 2018/0073698 A1* | 3/2018 | Orisich | F21S 41/663 |
| 2018/0163940 A1* | 6/2018 | Nozue | F21S 41/141 |
| 2019/0031086 A1 | 1/2019 | Gutjahr et al. | |
| 2019/0187284 A1* | 6/2019 | Raring | G01S 7/4817 |
| 2019/0271767 A1* | 9/2019 | Keilaf | G01S 7/4863 |
| 2020/0284883 A1* | 9/2020 | Ferreira | G01S 7/4816 |

FOREIGN PATENT DOCUMENTS

| | | |
|---|---|---|
| DE | 10262294 B4 | 11/2010 |
| DE | 202011103703 U1 | 1/2012 |
| DE | 202011108357 U1 | 3/2012 |
| DE | 102012103313 A1 | 10/2013 |
| DE | 102013216318 A1 | 2/2015 |
| DE | 102014205864 A1 | 10/2015 |
| DE | 102014112931 A1 | 3/2016 |
| DE | 102014222669 A1 | 5/2016 |
| DE | 102015201766 A1 | 8/2016 |
| DE | 102016200339 A1 | 7/2017 |
| EP | 2357398 A2 | 8/2011 |
| JP | 2003267124 A | 9/2003 |
| JP | 2010132170 A | 6/2010 |
| JP | 2012252802 A | 12/2012 |
| JP | 2016039021 A | 3/2016 |
| KR | 20130032686 A | 4/2013 |
| WO | 2015022115 A1 | 2/2015 |

* cited by examiner

HEADLIGHT FOR A VEHICLE

BACKGROUND OF THE INVENTION

Field of the Invention

The invention relates to a headlight for a vehicle with a housing, a lens, and a light module, which is pivotally mounted in the housing around a vertical axis, a lighting system as claimed, and a motor vehicle as claimed.

Headlights have special relevance in safety technology in the field of vehicles, for example, motor vehicles. Light functions, for example, a basic light distribution or low beams, respectively, and high beams have to meet high requirements in this case, inter alia, with respect to the light-dark boundary thereof, the illumination region, the intensity, and the homogeneity.

Adaptive light functions are increasingly also being used, for example, an adaptive cornering light. Conventionally, regions on the right edge of the illumination region are shaded and regions on the left edge are additionally released by canceling out the shading in the illumination region of the low beams, for example, in the case of a left-hand curve, for example. The illumination region in the optical impression thus shifts to the left. In the case of high beams, shading or masking, respectively, individual segments of the illumination region is additionally known, for example, so as not to negatively affect an object located in the illumination region, such as another vehicle.

However, it has proven to be disadvantageous in known headlights that the construction thereof is quite complex and the homogeneity of the light functions decreases from inner regions of the illumination region toward outer regions, which are made visible or not visible, respectively, by the intentional shading.

DE 10 2013 216 318 A1, for example, describes a method and a device for a motor vehicle, using which a light function consisting of a superposition of a first and a second partial light distribution can be generated. The first and second partial light distribution are generated in this case by first and second modules, on the one hand, by changing a position of movable elements and, on the other hand, by controlling individual light sources.

Furthermore, US 2014/0175978 A1 discloses a headlight for a motor vehicle having a pivotable LED matrix.

SUMMARY OF THE INVENTION

The invention is based on the object of providing a headlight for a vehicle, which has a low design complexity and improved homogeneity of the light functions.

The object is achieved by the subjects of the independent claims. Further preferred embodiments of the invention result from the remaining features mentioned in the dependent claims.

A first aspect of the invention relates to a headlight for a vehicle, comprising at least one housing, one lens, and one light module, which is mounted so it is pivotable in the housing around a vertical axis. It is provided according to the invention that the light module comprises at least one light source matrix having multiple individually controllable light sources, wherein at least one refractive element is associated with each of the light sources to generate high beams activatable segment by segment, and that the light module additionally comprises at least one further light source, with which at least one further refractive element is associated for generating a basic light distribution.

Expressed in other words, in the headlight, light sources for high beams in the form of a light source matrix and light sources for a basic light distribution, which preferably comprises low beams, are combined into a single light module and mounted so it is pivotable in the horizontal plane. The light sources can be LEDs, for example. Collimation lenses come into consideration as refractive elements, for example. The at least one refractive element for the high beams and the at least one further refractive element for the basic light distribution can also be formed as one component, which then comprises partial regions, which take into consideration the respective specific optical requirements.

Because the light module having low beams and high beams is pivotable, to some extent a simulated pivoting and/or displacement of the respective illumination region, as in the prior art, for example, by way of shading in the case of low beams or by activating and deactivating specific segments in the edge region of the illumination region of the high beams, is no longer required. In the headlight of the invention, this results in a significant improvement of the homogeneity of the respective illumination region, since, for example, when cornering, the illumination regions of both light functions are mechanically pivotable with the entire light module in such a way that the curved section located in front of the vehicle is optimally acquired. Moreover, by masking of specific sections of the high beams or deactivating the corresponding light sources, respectively, a preceding vehicle, which can also already be located in the curve, can be excluded from the illumination region of the high beams. It is furthermore advantageous that in the headlight according to the invention, solely the light module is mechanically pivoted. The moving mass and thus the mass moment of inertia are very low here. This results in an improved motor control capability of the pivot movement and better oscillation resistance, which is important in particular in lighting devices, since oscillations of the light module have significantly more visible effects with increasing distance from the vehicle. The number of individual parts and the costs are also reduced in relation to known solutions in the headlight according to the invention. In particular, only one single light module is required here.

In one preferred embodiment of the headlight of the invention, it is provided that at least one refractive element of the light module is adjustable by motor in at least one degree of freedom. For example, the collimation lenses for high beams or also low beams can be adjusted in the position or also orientation thereof for fine tuning of the illumination region. This is possible particularly accurately using a motor.

In a further preferred embodiment of the headlight of the invention, it is provided that the light module is mounted on a mechanical pivot frame. A pivot frame can be designed, for example, in gantry construction or also in C construction and can entirely or partially enclose the light module. All of this results in improved rigidity of the mounting of the light module. Furthermore, the pivot frame protects the light module when it is arranged therein. In particular in the installation of the headlight, this offers significant advantages and also facilitates the handling if pivot frame and light module are preinstalled and temporarily stored, for example. The pivot frame also offers engagement points for a receptacle device during the temporary storage here, without the sensitive light module having to be touched.

In a further preferred embodiment of the headlight of the invention, it is provided that either the pivot frame is mounted so it is pivotable in relation to the housing or the light module is mounted so it is pivotable in relation to the pivot frame. The light module is particularly preferably mounted so it is pivotable in relation to the pivot frame. Mechanical tolerances have less effect on the position and orientation of the light module here because of the shorter kinematic chain, which is advantageous for the light functions.

In a further preferred embodiment of the headlight of the invention, it is provided that the light module is mounted so it is pivotable in relation to the pivot frame by the light module being suspended on the vertical axis, which is supported by the pivot frame and extends through a mass center of gravity of the light module. For example, a pivot frame can be provided in gantry construction, in the inner region of which the light module is suspended approximately in the middle. The vertical axis can be supported, for example, by an upper and lower transverse strut of the pivot frame and mounted so it is rotatable therein. All of this results in great rigidity of the mechanical construction, which is unloaded without external effects because of the center of gravity suspension.

In a further preferred embodiment of the headlight of the invention, it is provided that an electric drive, which is arranged on a base construction of the pivot frame, is provided for pivoting the light module. The base construction can be, for example, a base plate, which is connected to the headlight, and to which the pivot frame is connected in a manner mounted so it is rotatable. The arrangement of the electric drive on the base construction has the result that it is not also pivoted, which is advantageous for the mass inertia of the pivoted regions. The drive energy can be transmitted, for example, via a spindle to the pivoted part, for example, the gantry, of the pivot frame.

A second aspect of the invention relates to a lighting system comprising at least one headlight according to the invention according to the above description and at least one control unit, via which at least one light module of the headlight is controllable and at least one electric drive of the headlight is controllable. For example, multiple individually controllable light sources of the light module are controllable, whereby it is possible to generate high beams activatable segment by segment. Furthermore, for example, at least one further light source of the light module is controllable, whereby a basic light distribution is implementable. For example, the electric drive can be controlled to pivot the light module.

In one preferred embodiment of the lighting system of the invention, it is provided that the control unit is capable of controlling the light module in dependence on a pivot angle of the light module. For example, a region of the high beams which affects an oncoming roadway and is masked on a straight route, can also be masked in the region of the oncoming roadway when cornering in dependence on the pivot of the light module. Since the control unit preferably also controls the electric drive for pivoting the light module, the items of information about the set pivot angle can also be used easily. All of this significantly enhances the safety of the lighting system.

In a further preferred embodiment of the lighting system of the invention, it is provided that the control unit activates or deactivates at least one of the individually controllable light sources of the light source matrix in dependence on the pivot angle. In this manner, it is possible to adapt an illumination region of the headlight to the pivot. Individual ones of the individually controllable light sources are preferably deactivated intentionally to intentionally mask individual regions in front of the vehicle, which greatly enhances the safety of the lighting system.

In a further preferred embodiment of the lighting system of the invention, it is provided that a sensor, for example, comprising a camera, radar, or infrared sensor, is provided for acquiring an object located in the illumination region of the headlight and corresponding light sources of the light source matrix are deactivatable to mask this object. The object can be, for example, a preceding or oncoming vehicle. This can particularly advantageously also be performed in dependence on the pivot angle of the light module to thus mask, for example, a preceding vehicle when cornering. The sensor can also comprise an Internet-based locating system which retrieves the location of the preceding vehicle.

A third aspect of the invention relates to a motor vehicle having a headlight according to the invention according to the above description and/or a lighting system according to the invention according to the above description.

In summary, it may be stated once again in other words that the invention relates to a headlight and a lighting system and a motor vehicle having the headlight, wherein the headlight unifies a high beam matrix and low beams in one jointly pivotable light module.

The various embodiments of the invention mentioned in this application are advantageously combinable with one another, if not stated otherwise in the specific case.

BRIEF DESCRIPTION OF THE SEVERAL VIEWS OF THE DRAWING

The invention is explained hereafter in exemplary embodiments on the basis of the associated drawings. In the figures.

DETAILED DESCRIPTION OF THE INVENTION

Figure 1:
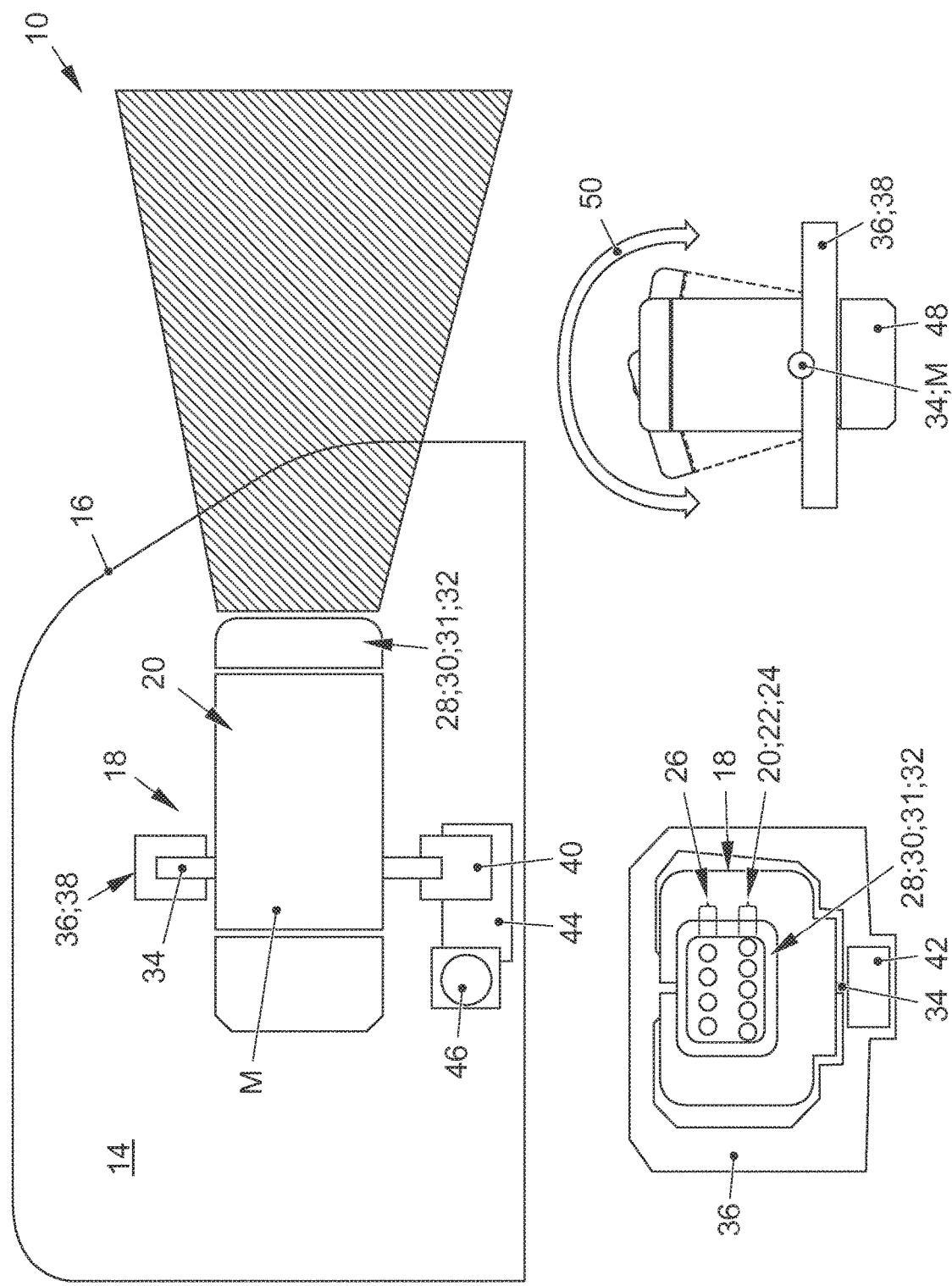
FIG. 1 shows a schematic structure of a headlight according to the invention.
Figure 3:
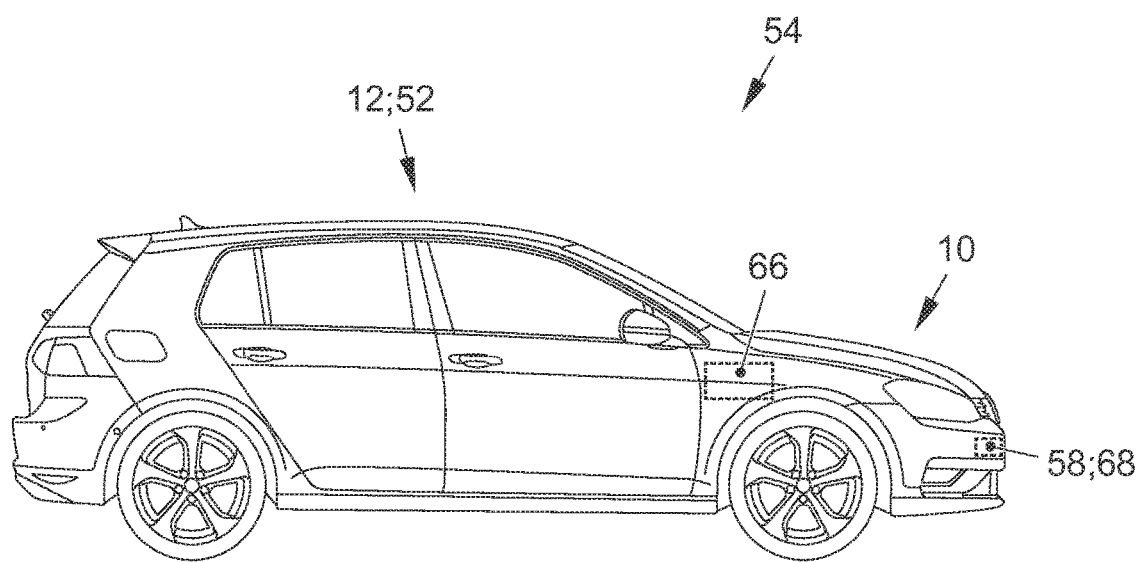
FIG. 3 shows a motor vehicle according to the invention having a headlight according to the invention.

FIG. 1 schematically shows the structure of a headlight 10 according to the invention for a vehicle 12 (cf. FIG. 3). A housing 14 of the headlight 10, which is terminated in the front region using a lens 16, is solely indicated here. A light module 18 is arranged in the housing 14. The light module 18 comprises a light source matrix 20. It is indicated in the bottom left part of FIG. 1 that the light source matrix 20 comprises multiple individually controllable light sources 22. The individually controllable light sources 22 are light-emitting diodes 24 in the present exemplary embodiment. It is recognizable that the light module 18 comprises a line having the light-emitting diodes 24 in the lower region. Further light sources 26 are arranged above the light source matrix 20. These form a further line above the light source matrix 20. The light source matrix 20 is used for generating high beams 60 which are activatable segment by segment. For this purpose, at least one refractive element 28, for example, collimation lenses for high beams 31, is associated with each of the light sources 22 or the light-emitting diodes 24, respectively. The refractive elements 28 are shown in simplified form in the present case. Furthermore, at least one further refractive element 30, for example, a collimation lens for low beams 32, which is also only shown in simplified form, is associated with the further light sources 26 for generating a basic light distribution 56, in the present case low beams.

It can be seen in the upper part of FIG. 1, in which the headlight 10 is shown schematically from the side, that the light module 18 is mounted so it is pivotable in the housing 14 around a vertical axis 34. It is shown in particular in FIG. 1 on the bottom left and right that the mounting of the light module 18 is implemented on a mechanical pivot frame 36. The pivot frame 36 is embodied in gantry construction in the present case and accommodates the vertical axis 34 approximately in the middle. The vertical axis 34 is mounted so it is rotatable on an upper and lower transverse strut 38, 40. In the example shown of the headlight 10, the pivot frame 36 is mounted so it is adjustable translationally in the vertical and horizontal directions in relation to the housing 14 via a mechanism (not shown in greater detail), in order to enable a basic alignment during the installation. The light module 18 is mounted so it is pivotable in relation to the pivot frame 36 via the vertical axis 34. Mounting points of the vertical axis 34 are located here respectively in the upper transverse strut 38 and the lower transverse strut 40 of the pivot frame 36. It is shown on the bottom left in FIG. 1 that a gearing 42 is arranged in the pivot frame 36 below the vertical axis 34. Furthermore, it is shown in the top in FIG. 1 that an electric drive 46 is provided on a base construction 44 of the pivot frame 36. The electric drive 46 is capable of transmitting its drive power via the gearing 42 and a spindle (not shown) to the vertical axis 34 to pivot the light module 18. The vertical axis 34 extends in this case through a mass center of gravity M of the light module 18. It is to be taken into consideration in the determination of the mass center of gravity that the light module 18 possibly comprises further add-on components, for example, a heat sink 48. A pivot range 50 of the light module 18 is shown once again on the bottom right in FIG. 1 for illustration.

Figure 2:
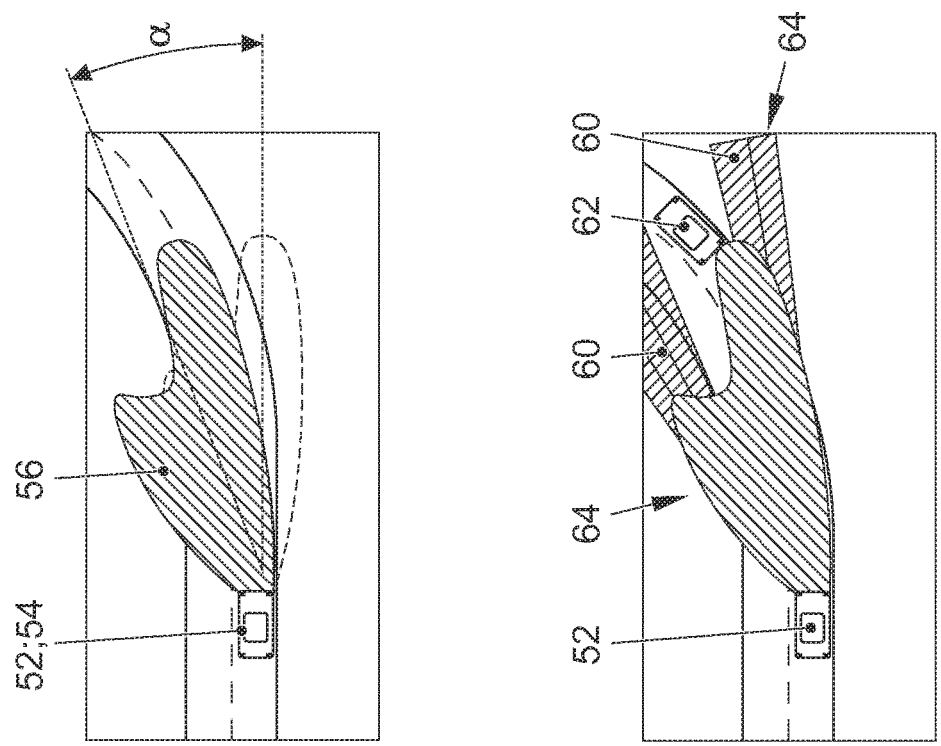
FIG. 2 shows a schematic illustration of light functions implementable using the headlight according to the invention.

FIG. 2 schematically shows on the basis of a motor vehicle 52 according to the invention, which is equipped with a lighting system 54 according to the invention, which contains in particular the headlight 10 according to the invention from FIG. 1, how different light functions are implementable. FIG. 2 shows at the top, for example, how a basic light distribution 56 in the form of low beams is generated using the headlight 10. In this case, it is shown how the light module 18 is pivoted around the vertical axis 34 by a pivot angle α. As a result, an illumination region of the basic light distribution 56 is pivoted accordingly. FIG. 2 shows at the bottom how the high beams 60, which are activatable segment by segment, are activated in addition to the case shown at the top in FIG. 2. In front of the motor vehicle 52, which is located immediately before entry into a curve, a further vehicle 62 is located already preceding in the curve. The high beams 60 activatable segment by segment of the motor vehicle 52 are also pivoted using the light module 18 around the vertical axis 34 and by the angle α in the situation shown at the bottom in FIG. 2. In this case, the further vehicle 62, which is located in the illumination region 64 of the headlight 10, is acquired using a sensor 58 (not shown), a camera 68 here (cf. FIG. 3). Corresponding light sources 22 of the light source matrix 20 are thereupon deactivated, so that the further vehicle 62 is masked and/or is no longer located in the illumination region 64. For this purpose, the illumination system 54 evaluates the pivot angle α and the position of the further vehicle 62 acquired by the camera 68 and thus computes which light sources 22 of the light source matrix 20 are to be deactivated.

FIG. 3 shows the motor vehicle 52 according to the invention, which is equipped with the lighting system 54 according to the invention. The headlight 10 according to the invention is arranged in the front part of the motor vehicle 52. The lighting system 54 comprises at least one control unit 66. The control unit 66 is capable of controlling the light module 18 installed in the headlight 10. Furthermore, the control unit 66 is capable of controlling the electric drive 46 of the headlight 10. In this way, the pivot of the light module 18 is effectuated. The control unit 66 can also be integrated on or in the housing 14 of the headlight 10. The control unit 66 also generates the control variables for activating or deactivating, respectively, the light sources 22, 26 of the light module 18 and possibly takes into consideration the pivot angle α in this case. For this purpose, the control unit 66 is also capable of processing camera data of the camera 68, with which the motor vehicle 52 is equipped. The control unit 66 preferably receives the camera data in the form of coordinates, for example, coordinates of the further vehicle 62. An already provided on board computer of the motor vehicle 52 can preprocess raw camera data of the camera 68, for example, to derive the coordinates. In this manner, other objects located in the illumination region 64 of the headlight 10 can also be acquired using the camera 68.

LIST OF REFERENCE NUMERALS 10 headlight
12 vehicle
14 housing
16 lens
18 light module
20 light source matrix
22 individually controllable light sources
24 light-emitting diodes (LEDs)
26 further light source
28 refractive element
30 further refractive element
31 collimation lenses for high beams
32 collimation lens for low beams
34 vertical axis
36 pivot frame
38 upper transverse strut
40 lower transverse strut
42 gearing
44 base construction
46 electric drive
48 heat sink
50 pivot range
52 motor vehicle
54 lighting system
56 basic light distribution
58 sensor
60 high beams
62 further vehicle
64 illumination region
66 control unit
68 camera
M mass center of gravity
α pivot angle

The invention claimed is:

1. A headlight for a vehicle, the headlight comprising:
a housing;
a lens;
a mechanical pivot frame; and
a light module supported on said pivot frame in said housing and pivotally mounted about a vertical axis;

said light module having at least one light source matrix with a multiplicity of individually controllable light sources, and at least one refractive element associated with each of said light sources and configured to generate high beams that are activatable segment by segment; and said light module additionally having at least one further light source and at least one further refractive element for generating a basic light distribution associated with said at least one further light source; and said pivot frame being moveable relative to said housing in translation in a vertical and horizontal direction; and said light module being pivotally mounted relative to said pivot frame, with said light module being suspended on a vertical axis, which is supported by said pivot frame and extends through a mass center of gravity of said light module.

2. The headlight according to claim 1, wherein at least one of said refractive elements of said light module is adjustable by a motor in at least one degree of freedom.

3. The headlight according to claim 2, wherein said pivot frame is pivotally mounted in relation to said housing or said light module is pivotally mounted in relation to said pivot frame.

4. The headlight according to claim 2, wherein said pivot frame has a base construction and an electric drive arranged on said base construction and configured for pivoting said light module.

5. The headlight according to claim 1, wherein said pivot frame has a base construction and an electric drive arranged on said base construction and configured for pivoting said light module.

6. A lighting system, comprising:
at least one headlight according to claim 1;
at least one control unit configured to control the light module of the at least one headlight and an electric drive of the at least one headlight.

7. The lighting system according to claim 6, wherein said at least one control unit is configured for controlling the light module in dependence on a pivot angle of the light module.

8. The lighting system according to claim 7, wherein said at least one control unit is configured to selectively activate or deactivate at least one of the individually controllable light sources of the light source matrix in dependence on the pivot angle.

9. The lighting system according to claim 6, further comprising a sensor for acquiring an object located in an illumination region of the headlight and wherein corresponding light sources of the light source matrix are deactivatable to mask the object.

10. A motor vehicle, comprising:
at least one headlight having a housing, a lens, and a light module disposed in said housing and pivotally mounted about a vertical axis;

an electric drive for pivoting said light module;

said light module having at least one light source matrix with a multiplicity of individually controllable light sources, and at least one refractive element associated with each of said light sources and configured to generate high beams that are activatable segment by segment; and said light module additionally having at least one further light source and at least one further refractive element for generating a basic light distribution associated with said at least one further light source;

at least one control unit configured to control said light module of said at least one headlight and said electric drive for pivoting said light module; and a mechanical pivot frame mounted to be moveable relative to said housing in translation in a vertical and horizontal direction;

said light module being pivotally mounted relative to said pivot frame, with said light module being suspended on a vertical axis that is supported by said pivot frame and extends through a mass center of gravity of said light module.

* * * * *